United States Patent Office 3,080,216
Patented Mar. 5, 1963

3,080,216
PROCESS OF PRODUCING CALCIUM CARBIDE
Mathias Ovrom Sem, Smestad, Oslo, Norway, assignor to Elektrokemisk A/S, Oslo, Norway, a corporation of Norway
No Drawing. Filed Sept. 14, 1959, Ser. No. 839,600
6 Claims. (Cl. 23—208)

This invention relates to a method of preparing carbonaceous reducing agents such as coke, anthracite coal or the like for use in smelting furnaces whereby the charge may be preheated without having large losses of reducing agent in the preheating operation. Such reducing agents are used for example in smelting pig iron, ferro alloys, carbide and the like, and we have found that this invention is particularly useful in the production of calcium carbide.

According to the present invention the carbonaceous reducing material is ground to small pieces and then is given a thin coating of calcium compound. We have found that hydrate of lime produced as slime from production of acetylene is particularly useful for this purpose. However, it may be advantageous to use other calcium compounds such as lime or limestone and for many purposes I prefer to use a combination of the calcium hydrate and the lime or limestone.

When such a coating is employed it is possible to heat the carbonaceous material in the preheating operation to temperatures of as high as 800° to 900° C. without substantial loss. If the reducing agent is used in an operation involving lime as in the production of calcium carbide it is known that at these temperatures the limestone itself is calcined and therefore by preparing the carbonaceous material in the manner contemplated by this invention, it is possible to use limestone in the furnace instead of having to use burnt lime, or if desired only a part of the burnt lime need be substituted by the limestone.

The hydrate of lime from acetylene production is now a waste product, disposal of which provides difficulties for the carbide industry. While this material will serve my purpose in many fields, if it is used alone for coating the coke or other carbonaceous material, I have found that in the production of calcium carbide there is a danger that the circulation of too much lime will cause an accumulation of impurities in the carbide. For this reason I prefer to use from 30% to 60% of the required quantity of lime in the form of the calcium hydrate and from 40% to 70% may be new lime, which if desired may be wholly or partly in the form of limestone. The relative proportions between the hydrate of lime and the burnt lime or limestone can be adjusted depending on the purity of the carbide required.

A thin but very dense strong coating can be obtained by mixing the ground up reducing agent with the hydrate of lime plus burnt lime or limestone that is to be used. This may be done in a drum mixer or a pelletizing drum or plate may be used. After the coating is applied it is advisable to store the carbonizing material in the air for some time when the lime will be carbonated and the coating will harden to form a hard shell.

It will also be found that the coated reducing agent will have a much higher electrical resistance than with ordinary coke, which permits the use of higher furnace voltages. This means that the electrical conditions in the furnace are greatly improved and the production will be increased and larger furnaces may be used. The process may be used in conjunction with preheating of the charge in a separate furnace such as a shaft furnace or rotary kiln or the preheating may take place in the furnace shafts themselves.

This invention may be readily understood from the following illustrative example.

Example

Gas coke of 10 to 20 mm. grain size was mixed with an equal amount of lime hydrate as obtained from an acetylene operation where calcium carbide had been treated with water. The mixture of the coke and hydrate was moistened with water and pelletized on a pelletizing saucer to produce pellets of the size ordinarily used in a furnace. By this operation the coke grains were coated by a lime coating of $\frac{1}{10}''$ thickness. After drying in the air for a number of hours it was found that this coating had become quite strong. In some instances the product was treated with $CO_2$ at a temperature of about 50° C. and it was found that this considerably increased the strength of the coating. For example, where the pellets were treated with $CO_2$ for 3 hours it was found that a very strong coating was obtained with a carbonization degree of 40%.

The lime coated coke was mixed with ground limestone in the proportions employed for making calcium carbide and charged into an electric smelting furnace which was equipped with shafts where air was blown in for oxidation of the CO in the furnace gases. The combustion heat of these gases was enough to heat the limestone of the charge to approximately 1200° C. At this temperature the $CO_2$ in the limestone was driven out so that by the time the charge reached the smelting operation the limestone was the equivalent of burnt lime.

The charge of the carbide furnace was found not to be substantially conductive until the temperature of about 1200° C. was reached and this temperature was not attained until the charge had reached the operative part of the furnace. As a result the electric current was very much concentrated in the charge around the lower ends of the electrodes and it was found that the operating voltage of the furnace could be materially increased.

This is important as it allows an increase of the kw. developed in each electrode without reducing the power factor. For example, previously it was necessary to use electrodes of about 1700 mm. diameter in order to develop 40,000 kw. in a three-phase furnace. Where the operating voltage is increased by 20% it is possible to increase the maximum allowable kw. load by at least 30% without reducing the power factor below a permissible limit and without increasing the size of the electrodes.

It may be noted that the gas generated in a carbide furnace contains about 90% CO and has a calorific value corresponding to approximately 40% of the heat developed in the furnace by the electric current. The gas thus contains enough heat to calcine the limestone and preheat the charge to about 1200° C. as stated above.

In cases where the reducing agent is to be used for other smelting operations the coating may contain higher percentages of limestone and even though these operations may not have all the advantages of using the treatment for the production of calcium carbide it is found that the new invention will be valuable.

I claim:

1. A process for producing calcium carbide in a smelting furnace which comprises the steps of coating pieces of a carbonaceous reducing agent selected from the group consisting of anthracite coal and coke with a calcium compound in an amount to provide an excess of carbon over that required for reduction of such calcium compound in the furnace, and then in a second separate step charging the coated pieces of carbonaceous reducing agent into the smelting furnace along with additional charge having less than the amount of carbon required for the reduction of such additional charge in the smelting furnace.

2. The process specified in claim 1 in which the reducing agent is coated with hydrate of lime resulting from the decomposition of calcium carbide with water.

3. The process specified in claim 1 in which the coated pieces of carbonaceous reducing agent are pre-heated before being introduced into the furnace.

4. The process specified in claim 1 in which the additional charge comprises additional calcium compound.

5. The process specified in claim 4 in which between about 30 to 60 percent of the amount of calcium compound introduced into the furnace is in the form of hydrate of lime while the remainder of the calcium compound introduced into the furnace is selected from the group consisting of lime and limestone.

6. The process specified in claim 1 in which the pieces of carbonaceous reducing agent have one dimension which measures from about 10 to 20 mm.

References Cited in the file of this patent

UNITED STATES PATENTS

| | | |
|---|---|---|
| 1,137,567 | Becket | Apr. 27, 1915 |
| 2,674,581 | Balcar | Apr. 6, 1954 |